US011373621B2

(12) United States Patent
Abe

(10) Patent No.: US 11,373,621 B2
(45) Date of Patent: Jun. 28, 2022

(54) DISPLAY DEVICE, DISPLAY CONTROL METHOD, AND STORAGE MEDIUM

(71) Applicant: SHARP KABUSHIKI KAISHA, Sakai (JP)

(72) Inventor: Takashi Abe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/220,219

(22) Filed: Apr. 1, 2021

(65) Prior Publication Data

US 2021/0366435 A1 Nov. 25, 2021

(30) Foreign Application Priority Data

May 22, 2020 (JP) ............................ JP2020-089980
Jan. 22, 2021 (JP) ............................ JP2021-009146

(51) Int. Cl.
*G09G 5/10* (2006.01)
*G09G 3/3225* (2016.01)
*H04N 9/69* (2006.01)

(52) U.S. Cl.
CPC ............. *G09G 5/10* (2013.01); *G09G 3/3225* (2013.01); *G09G 2320/0646* (2013.01); *G09G 2320/0673* (2013.01); *G09G 2360/16* (2013.01)

(58) Field of Classification Search
CPC ................... G09G 5/10; G09G 3/3225; G09G 2320/0646; G09G 2360/16; G09G 2320/0673; H04N 9/68; H04N 9/69
See application file for complete search history.

(56) References Cited

U.S. PATENT DOCUMENTS

2002/0036716 A1* 3/2002 Ito .......................... H04N 5/202 348/674
2005/0280869 A1* 12/2005 Kameyama .............. H04N 1/60 358/3.01
2006/0164524 A1* 7/2006 Shibano ................... H04N 5/20 348/234
2007/0286533 A1* 12/2007 Harada .................... G09G 5/10 348/E5.073
2008/0043120 A1* 2/2008 Mitsunaga ........... H04N 5/2351 348/238

(Continued)

FOREIGN PATENT DOCUMENTS

JP 2009-017200 A 1/2009

*Primary Examiner* — Antonio Xavier
(74) *Attorney, Agent, or Firm* — ScienBiziP, P.C.

(57) ABSTRACT

A display device (101) includes: an output luminance calculation section (83) configured to generate an output luminance for an input luminance for a first reference point residing in a low luminance region, an output luminance for an input luminance for a second reference point residing in a high luminance region, and an output luminance for an input luminance for a third reference point residing between the first and second reference points in such a manner that a straight line connecting the first and third reference points has a different slope than does a straight line connecting the third and second reference points; and a luminance conversion section (85) configured to convert input luminances in the input image to output luminances based on a gamma curve specified using the input and output luminances for the first, second, and third reference points, to output the output image.

9 Claims, 10 Drawing Sheets

(56) References Cited

U.S. PATENT DOCUMENTS

| | | | | |
|---|---|---|---|---|
| 2009/0009665 | A1 | 1/2009 | Tsutsumi et al. | |
| 2013/0155330 | A1* | 6/2013 | Longhurst | H04N 9/68 348/708 |
| 2018/0182070 | A1* | 6/2018 | Gal | G06T 7/13 |
| 2021/0304377 | A1* | 9/2021 | Nishio | G06T 5/009 |

* cited by examiner

DISPLAY DEVICE, DISPLAY CONTROL METHOD, AND STORAGE MEDIUM

FIELD OF THE INVENTION

The present invention relates to display devices, display control methods, and storage medium.

BACKGROUND OF THE INVENTION

Image processing devices that perform luminance correction on input images by using a gamma curve are well known. Patent Literature 1, as such an example, discloses an image processing device that can generate an optimal gamma curve in accordance with the sum frequency for a black-end range in the correction range and luminance histograms for a white-end range in the correction range.

CITATION LIST

Patent Literature

Patent Literature 1: Japanese Unexamined Patent Application Publication, Tokukai, No. 2009-017200

SUMMARY OF THE INVENTION

Problems to be Solved by the Invention

The conventional art described above, for example, generates a gamma curve for improving contrast in a near-black range in the input image and another gamma curve for improving contrast in a near-white range in the input image. The conventional art, however, is not capable of determining a gamma curve for the middle luminance region based on the input image. A typical input image has a luminance distribution concentrating in the middle luminance region. Therefore, the conventional art cannot control luminance in the middle luminance region.

The present invention, in an aspect thereof, has been made in view of these problems and has an object to control luminance in a middle luminance region of an image.

Solution to the Problems

To address these problems, the present invention, in an aspect thereof, is directed to a display device including: an input luminance acquisition section configured to acquire an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point; an output luminance generation section configured to generate an output luminance for the input luminance for the first reference point, an output luminance for the input luminance for the second reference point, and an output luminance for the input luminance for the third reference point in such a manner that a straight line connecting the first reference point and the third reference point has a different slope than does a straight line connecting the third reference point and the second reference point; and a luminance conversion section configured to convert the input luminances in the input image to the output luminances based on the gamma curve specified using the input and output luminances for the first, second, and third reference points, to output the output image.

To address the problems, the present invention, in another aspect thereof, is directed to a display control method including: the input luminance acquisition step of acquiring an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point; the output luminance generation step of generating an output luminance for the input luminance for the first reference point, an output luminance for the input luminance for the second reference point, and an output luminance for the input luminance for the third reference point in such a manner that a straight line connecting the first reference point and the third reference point has a different slope than does a straight line connecting the third reference point and the second reference point; and the luminance conversion step of converting the input luminances in the input image to the output luminances based on the gamma curve specified using the input and output luminances for the first, second, and third reference points, to output the output image.

Advantageous Effects of the Invention

The present invention, in an aspect thereof, can control luminance in a middle luminance region of an image.

DESCRIPTION OF EMBODIMENTS

Embodiment 1

The following will describe Embodiment 1 of the present invention with reference to FIGS. 1 to 7.

Figure 1:
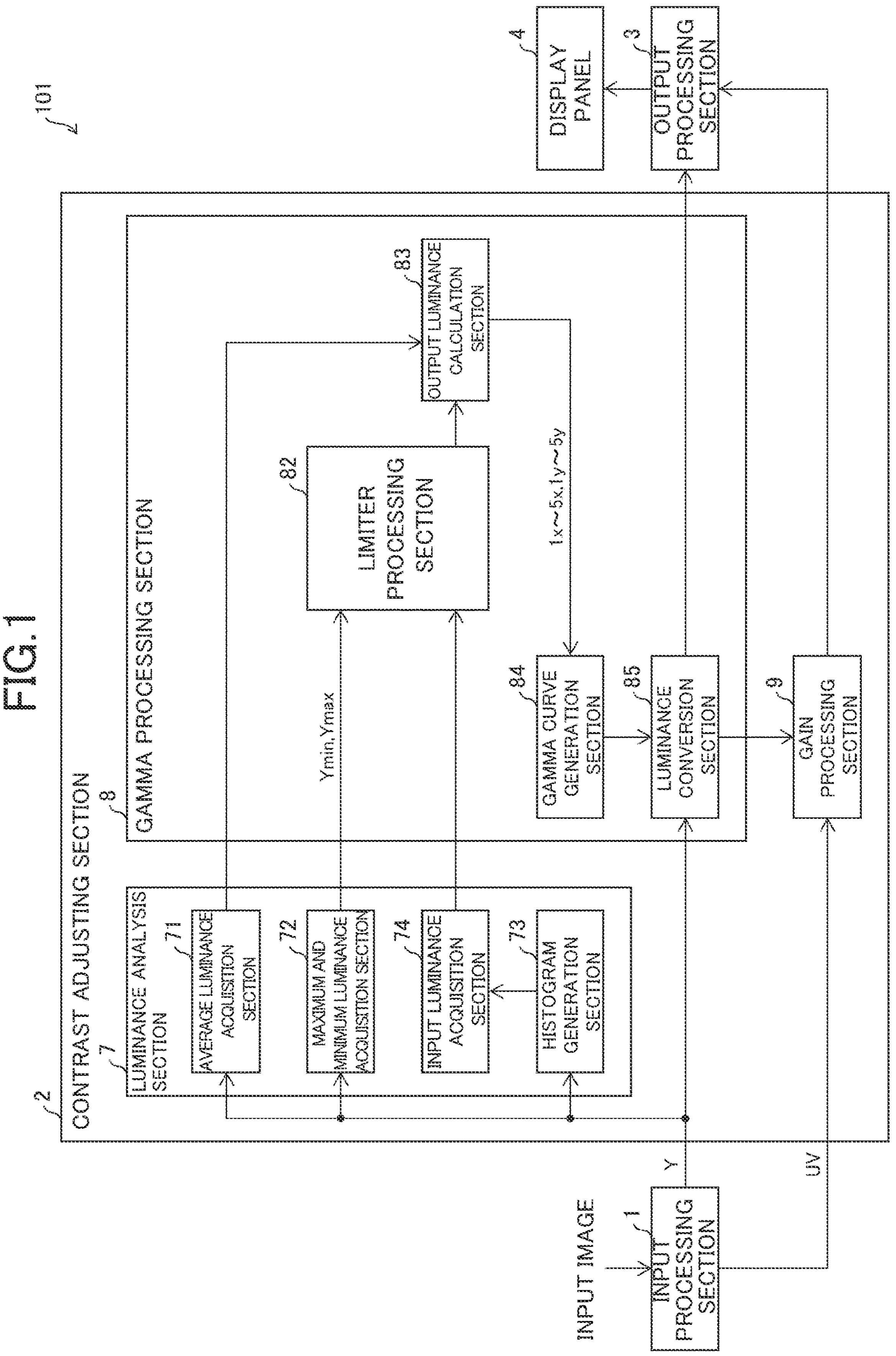
FIG. 1 is a block diagram of a configuration of a display device in accordance with Embodiment 1 of the present invention.

FIG. 1 is a block diagram of a configuration of a display device 101 in accordance with Embodiment 1.

Referring to FIG. 1, the display device 101 includes an input processing section 1, a contrast adjusting section 2, an output processing section 3, and a display panel 4.

The display device 101 is fed with an RGB signal as an input image (input image signal). The input processing section 1 then converts the RGB signal to a YUV signal. The YUV signal represents color information by a combination of a luminance signal (Y signal) and color difference signals (U signal and V signal). The input processing section 1 separates the YUV signal into a luminance signal and color difference signals. These luminance and color difference signals are fed to the contrast adjusting section 2.

The contrast adjusting section 2 adjusts contrast in the luminance signal on the basis of, for example, a histogram of the luminance signal, in other words, the input luminance. The contrast adjusting section 2 will be described later in detail.

The output processing section 3 carries out various processes on the luminance and color difference signals outputted from the contrast adjusting section 2 in such a manner that the signals are in suitable format to produce a display on the display panel 4. The output processing section 3 primarily synthesizes a YUV signal from the luminance and color difference signals outputted from the contrast adjusting section 2 and converts the YUV signal to a RGB signal. The output processing section 3 further carries out white balance adjustment on the RGB signal so as to suit the display panel 4 to which the RGB signal is inputted.

The display panel 4 displays an image on the basis of the RGB signal outputted from the output processing section 3. The display panel 4 is built around, for example, a liquid crystal display panel or an OLED (organic light-emitting diode) panel.

A detailed description is now given of the contrast adjusting section 2.

The contrast adjusting section 2 includes a luminance analysis section 7, a gamma processing section 8, and a gain processing section 9 to adjust the contrast of an input image.

The luminance analysis section 7 analyzes a luminance signal (input luminance) fed to the luminance analysis section 7 to acquire various analysis information. The luminance analysis section 7 includes an average luminance acquisition section 71, a maximum and minimum luminance acquisition section 72, a histogram generation section 73, and an input luminance acquisition section 74.

The average luminance acquisition section 71 calculates an average of the input luminance to acquire an average luminance (APL or average picture level) as analysis information.

The maximum and minimum luminance acquisition section 72 acquires a maximum luminance Ymax and a minimum luminance Ymin as analysis information from the input luminance.

The histogram generation section 73 generates a histogram of input luminance on the basis of the input luminance. As an example, when the input luminance has 256 gray levels, the histogram generation section 73 divides the input luminance equally into 32 bins and counts pixels in each bin as the frequency. The bin is not necessarily designed as in this example and is specified in a suitable manner in accordance with, for example, the gray level count of the input luminance. For instance, the bin may be specified for each individual gray level.

The input luminance acquisition section 74 acquires an input luminance for each first, second, and third reference point. The third reference point resides between the first reference point and the second reference point. A gamma curve (detailed later) passes through the first, second, and third reference points.

The gamma curve is a curved line representing the output luminance (luminance for an output image) for the input luminance (luminance for an input image) in an X-Y coordinate system. The gamma curve has an X value representing an input luminance and a Y value representing an output luminance. The gamma curve passes through a plurality of points including at least the first reference point, the second reference point, the third reference point, a fourth reference point, and a fifth reference point.

The first reference point resides in a low luminance region. The second reference point resides in a high luminance region. The third reference point resides between the first reference point and the second reference point in a middle luminance region. The fourth reference point corresponds to either the minimum luminance Ymin of the input image or an approximate minimum luminance that is approximately equal to the minimum luminance Ymin. The fifth reference point corresponds to either the maximum luminance Ymax of the input image or an approximate maximum luminance that is approximately equal to the maximum luminance Ymax.

The input luminance acquisition section 74 computes an input luminance for each main point that dictates a gamma curve, on the basis of the histogram generated by the histogram generation section 73, to acquire input luminances. The main points include at least the first reference point residing in the low luminance region for the input luminance, the second reference point residing in the high luminance region for the input luminance, and the third reference point residing between the first reference point and the second reference point.

Specifically, the input luminance acquisition section 74 sequentially adds up the ratio of the frequency in each bin to the sum of the frequencies across all the bins in the histogram, starting from the ratio of the frequency in the lowest bin, and computes an input luminance for the first reference point by using a prescribed formula that contains, for example, the frequencies in the bins beyond the low luminance region defined by a low luminance ratio. The input luminance acquisition section 74 also sequentially adds up the ratio of the frequency in each bin to the sum of the frequencies across all the bins in the histogram, starting from the ratio of the frequency in the highest bin, and computes an input luminance for the second reference point by using a prescribed formula that contains, for example, the frequencies in the bins beyond the high luminance region defined by a high luminance ratio. The input luminance acquisition section 74 also computes as an output luminance for the third reference point on the basis of the computed input luminances for the first reference point and the second reference point.

The input luminance acquisition section 74 acquires input luminances 1*x* and 2*x* through computation. Alternatively, the input luminance acquisition section 74 may acquire externally fed, fixed input luminances 1*x* and 2*x*. As another alternative, the input luminance acquisition section 74 may acquire input luminances 1*x* and 2*x* computed by, for example, a server and fed to the display device 101.

The input luminance acquisition section 74 may in another configuration serve as an input luminance computation section customized specifically to the computation of the input luminances 1*x* and 2*x* and another input luminance 3*x*.

The gamma processing section 8 generates a gamma curve on the basis of the analysis information supplied from the luminance analysis section 7 and converts input luminances to output luminances in accordance with the luminance characteristics represented by the gamma curve. The gamma processing section 8 includes a limiter processing section 82, an output luminance calculation section (output luminance generation section) 83, a gamma curve generation section 84, and a luminance conversion section 85, to perform this series of processes.

The limiter processing section 82 performs a limiter process on the input luminances for the first to fifth reference points as in the following. The limiter processing section 82, when necessary, replaces the input luminance for the first reference point and the input luminance for the fourth reference point with respective values that do not exceed individually specified upper limits. The limiter processing section 82, when necessary, also replaces the input luminance for the second reference point and the input luminance for the fifth reference point with respective values that do not exceed individually specified upper limits. The limiter processing section 82, when necessary, also replaces the input luminance for the third reference point with a value that is not outside a prescribed range.

The output luminance calculation section 83 computes an output luminance for the first reference point in accordance with a difference between the input luminance for the fourth reference point that has been subjected to the limiter process by the limiter processing section 82 and the input luminance for the first reference point that has been subjected to the limiter process by the limiter processing section 82, to generate the output luminance. The output luminance calculation section 83 also computes an output luminance for the second reference point in accordance with a difference between the input luminance for the fifth reference point that has been subjected to the limiter process by the limiter processing section 82 and the input luminance for the second reference point that has been subjected to the limiter process by the limiter processing section 82, to generate the output luminance. The output luminance calculation section 83 also computes an output luminance for the third reference point in accordance with the average luminance of the input image acquired by the average luminance acquisition section 71, to generate the output luminance.

The gamma curve generation section 84 generates a gamma curve that passes through the first to fifth reference points specified by the input luminances computed for the first to fifth reference points by the input luminance acquisition section 74 and the output luminances computed for the first to fifth reference points by the output luminance calculation section 83.

The luminance conversion section 85 converts the luminance signal outputted from the input processing section 1 in accordance with the luminance characteristics represented by the gamma curve.

The gain processing section 9 adjusts a shade included in the UV signal in accordance with the conversion of the luminance signal by the luminance conversion section 85. Specifically, the gain processing section 9 multiplies the UV signal by a gain that matches a variation of the luminance signal in accordance with the gamma curve.

A description is now given of the contrast adjustment (display control method) performed by the contrast adjusting section 2 structured as described in the foregoing in the display device 101.

Figure 2:
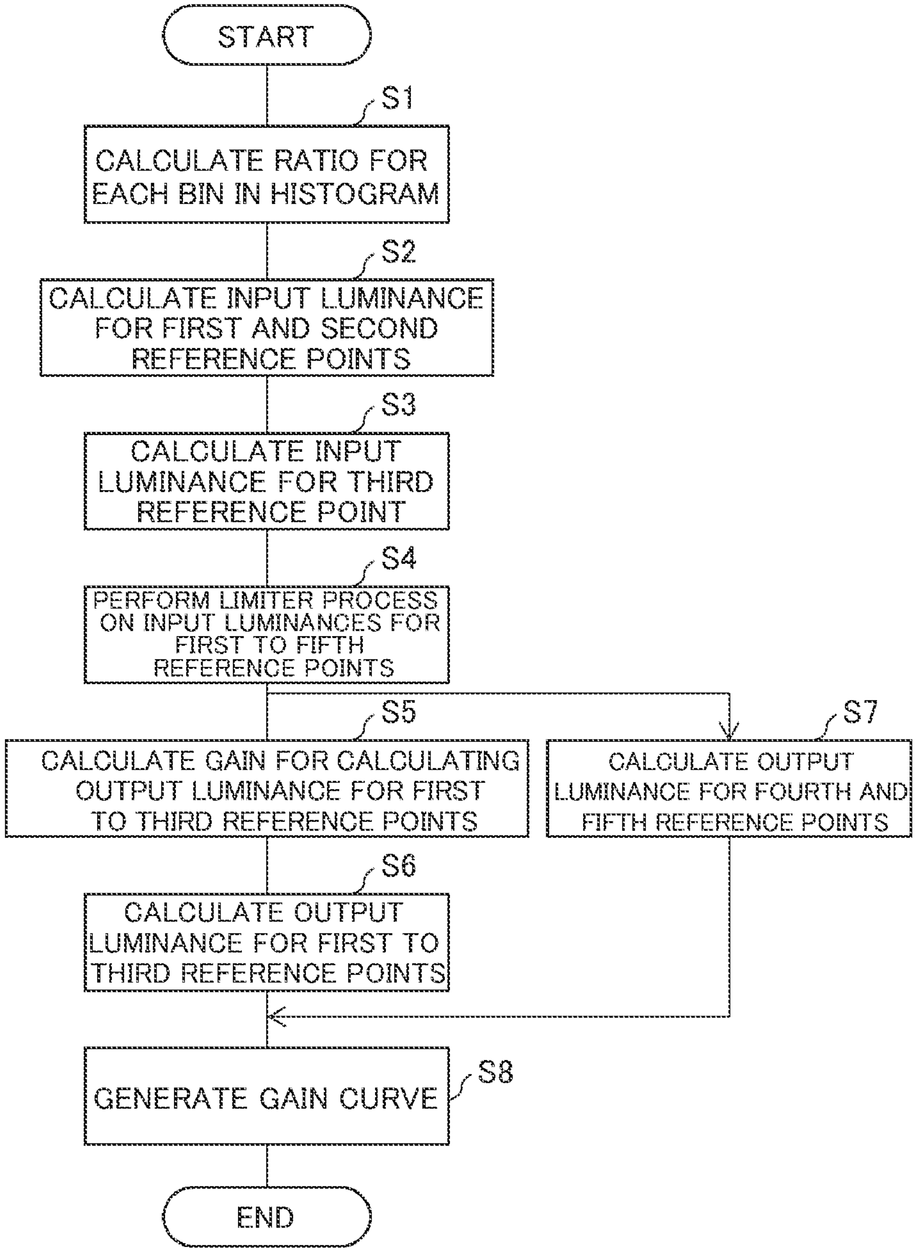
FIG. 2 is a flow chart representing a process of generating a gamma curve in a contrast adjusting section in the display device.
Figure 3:
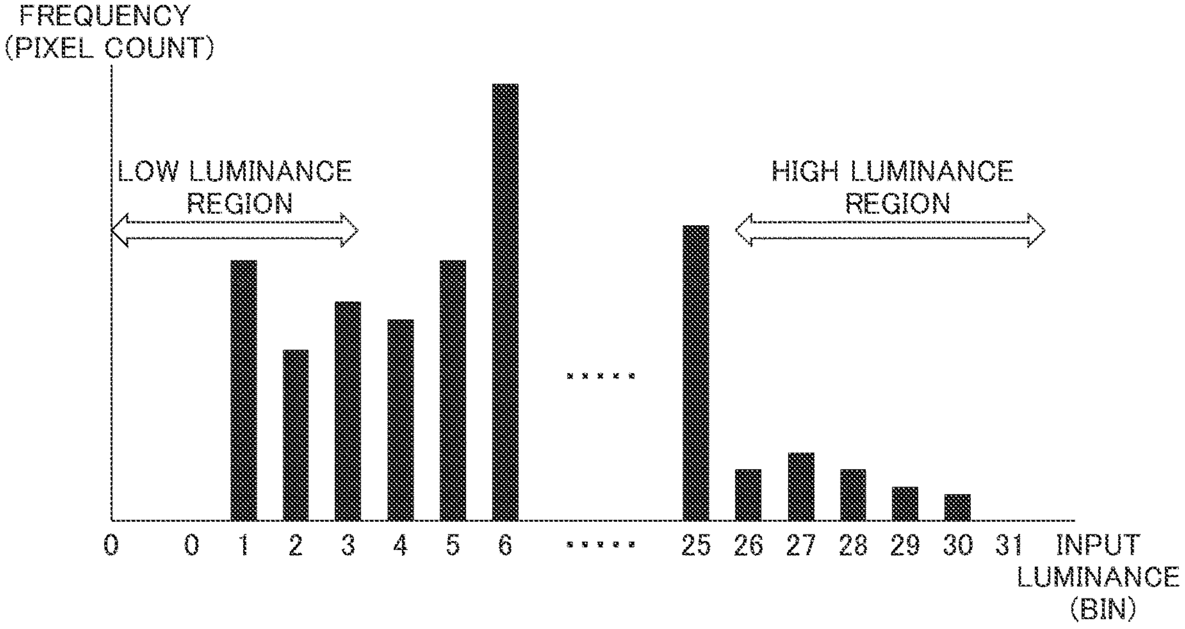
FIG. 3 is an exemplary histogram generated by a histogram generation section in the contrast adjusting section.
Figure 4:
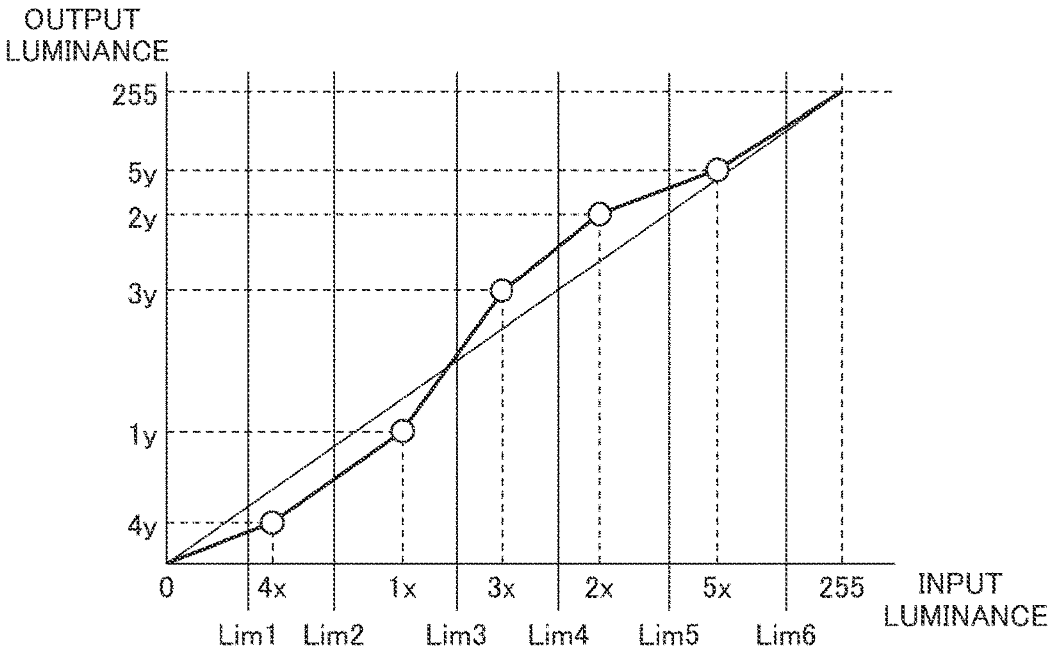
FIG. 4 is a diagram of processes carried out by an input luminance acquisition section, a limiter processing section, and an output luminance calculation section in the contrast adjusting section.
Figure 5:
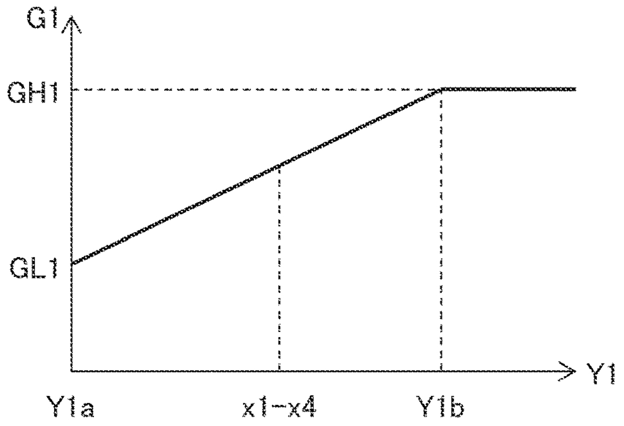
FIG. 5 is a diagram of a relationship between an input luminance difference and a gain, for use by an output luminance calculation section in the contrast adjusting section in calculating a gain used in the computation of an output luminance in a low luminance region.
Figure 6:
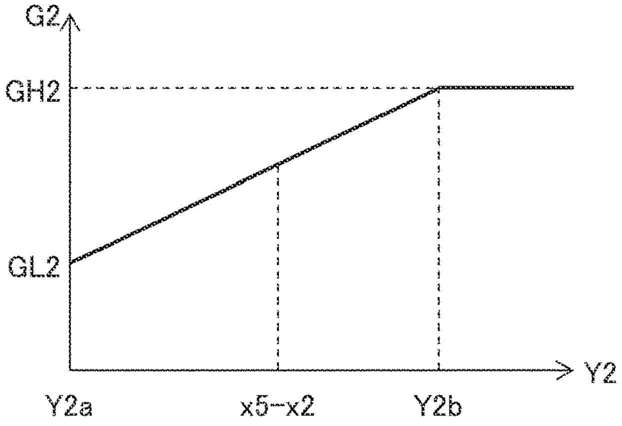
FIG. 6 is a diagram of a relationship between an input luminance difference and a gain, for use by the output luminance calculation section in calculating a gain used in the computation of an output luminance in a high luminance region.
Figure 7:
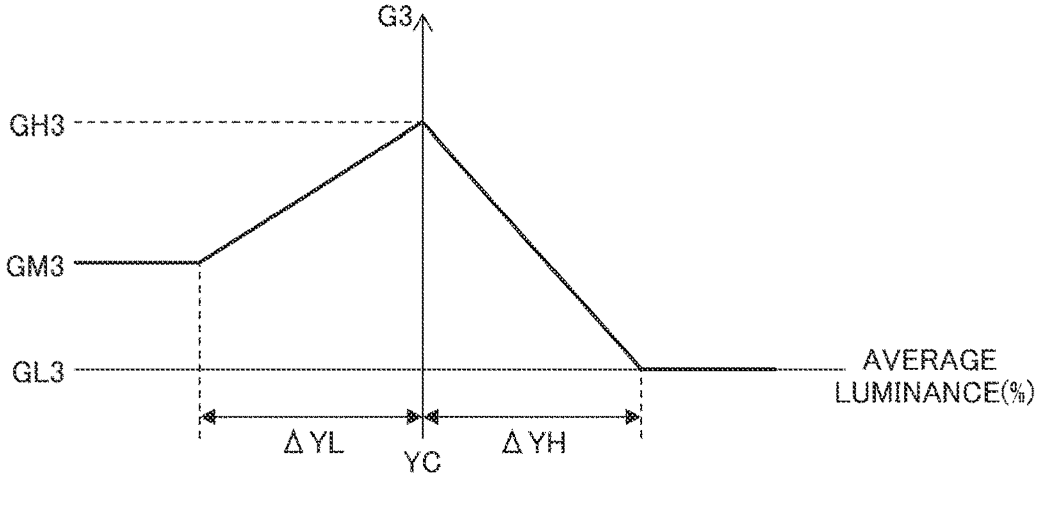
FIG. 7 is a diagram of a relationship between an average luminance of an input image and a gain, for use by the output luminance calculation section in calculating a gain used in the computation of an output luminance in a middle luminance region.
Figure 13:
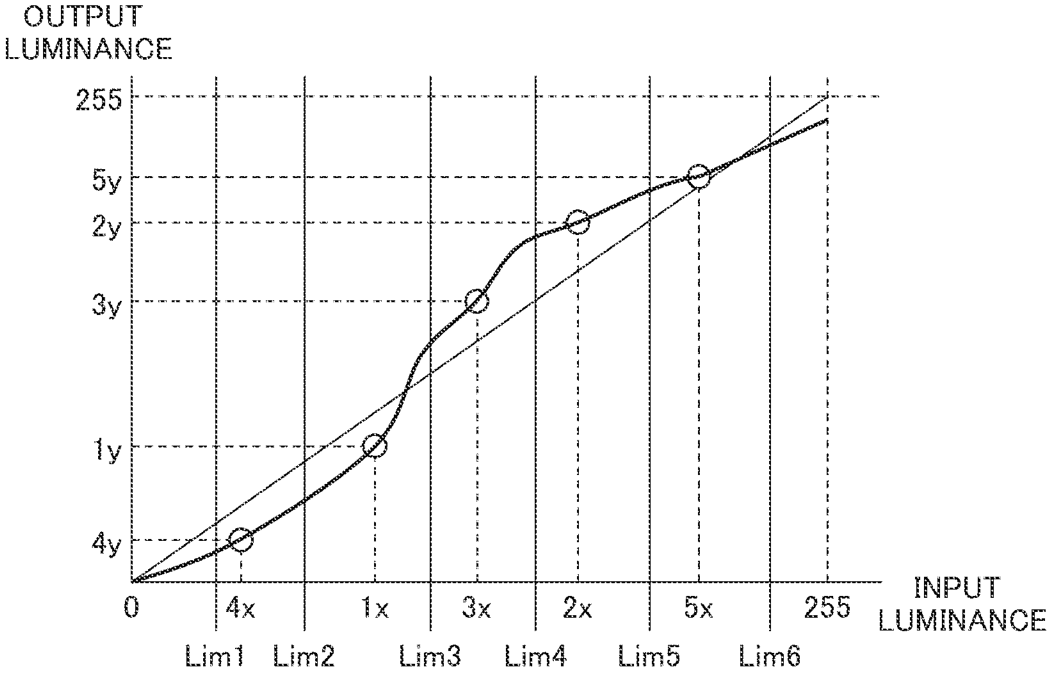
FIG. 13 is a diagram of an exemplary gamma curve generated by a gamma curve generation section in the display device in accordance with Embodiment 1 of the present invention.
Figure 14:
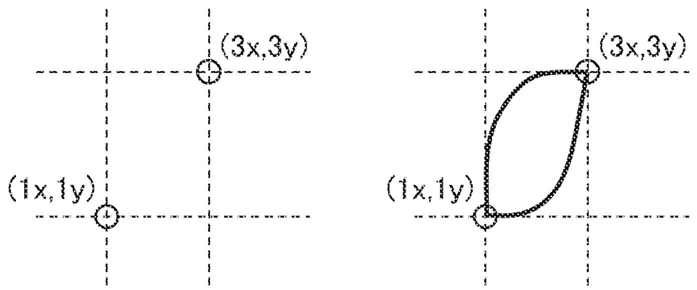
FIG. 14 is a diagram of an exemplary curved line generated by the gamma curve generation section so as to connect reference points.
Figure 15:
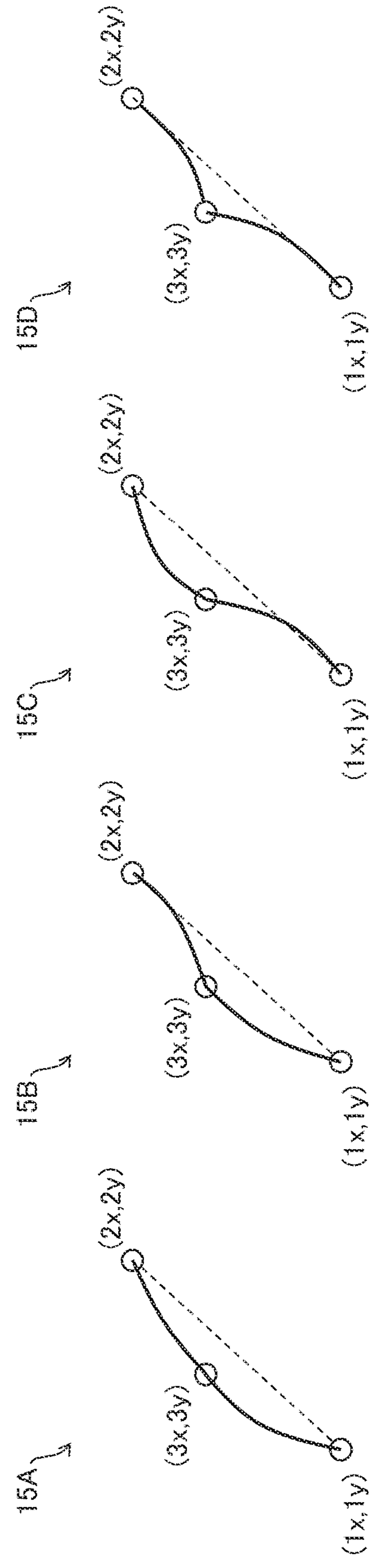
FIG. 15 is a diagram of four general shapes of the curved lines generated by the gamma curve generation section so as to connect a first reference point, a third reference point, and a second reference point.
Figure 16:
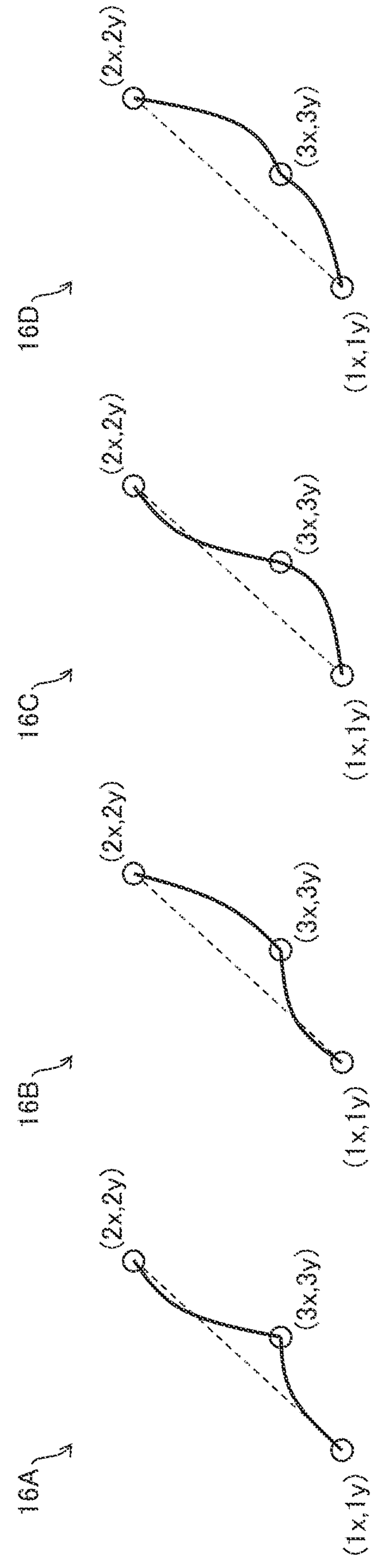
FIG. 16 is a diagram of four general shapes of the curved lines generated by the gamma curve generation section so as to connect the first reference point, the third reference point, and the second reference point.

FIG. 2 is a flow chart representing a process of generating a gamma curve in the contrast adjusting section 2. FIG. 3 is an exemplary histogram generated by the histogram generation section 73. FIG. 4 is a diagram of processes carried out by the input luminance acquisition section 74, the limiter processing section 82, and the output luminance calculation section 83. FIG. 5 is a diagram of a relationship between an input luminance difference and a gain, for use by the output luminance calculation section 83 in calculating a gain used in the computation of an output luminance in a low luminance region. FIG. 6 is a diagram of a relationship between an input luminance difference and a gain, for use by the output luminance calculation section 83 in calculating a gain used in the computation of an output luminance in a high luminance region. FIG. 7 is a diagram of a relationship between an average luminance of an input image and a gain, for use by the output luminance calculation section 83 in calculating a gain used in the computation of an output luminance in a middle luminance region. FIG. 13 is a diagram of an exemplary gamma curve generated by the gamma curve generation section 84. FIG. 14 is a diagram of an exemplary curved line generated by the gamma curve generation section so as to connect the reference points. FIGS. 15 and 16 are diagrams respectively of four general shapes of the curved lines generated by the gamma curve generation section so as to connect the first reference point, the third reference point, and the second reference point.

First, the histogram generation section 73 generates an input luminance histogram as shown in FIG. 3. Referring to FIG. 2, the input luminance acquisition section 74 calculates, from the histogram generated by the histogram generation section 73, a ratio for each bin in the histogram (step S1).

The input luminance acquisition section 74 calculates a ratio for each bin, for example, as detailed below. In this example, it is assumed that the input luminance has 256 gray levels that are divided into 32 bins BIN0 to BIN31 in the histogram. The frequency in each bin in the histogram is a pixel count.

Table 1 shows the designation of the bins (gray level ranges) and the highest luminance value for each bin. The input luminance acquisition section 74 calculates a ratio (bin ratio) for each bin for an input image as shown in Table 1. The low luminance ratio Brate described above is set to 2.0%, whilst the high luminance ratio Wrate described above is set to 1.0%.

TABLE 1

| Bin | Gray Level Range | Highest Luminance Value | Bin Ratio (%) |
|---|---|---|---|
| BIN0 | 0-7 | 7 | 0 |
| BIN1 | 8-15 | 15 | 0 |
| BIN2 | 16-23 | 23 | 1.0 |
| BIN3 | 24-31 | 31 | 0.6 |
| BIN4 | 32-39 | 39 | 0.7 |
| . | . | . | . |
| . | . | . | . |
| . | . | . | . |
| BIN27 | 216-223 | 223 | 0.5 |
| BIN28 | 224-231 | 231 | 0.3 |
| BIN29 | 232-239 | 239 | 0.6 |
| BIN30 | 240-247 | 247 | 0 |
| BIN31 | 248-255 | 255 | 0 |

The input luminance acquisition section 74 computes the input luminance (X-value on the gamma curve) 1*x* for the first reference point and the input luminance 2*x* for the second reference point under these conditions (step S2, input luminance acquisition step) through the following process. The input luminance acquisition section 74 first sequentially adds up the bin ratios starting from the lowest bin and stops adding up the bin ratios when the sum exceeds the low luminance ratio Brate (in this example, when the bin ratios are added up from BIN0 to BIN4 so that the resultant sum (=2.3%) exceeds 2.0%). The input luminance acquisition section 74 also sequentially adds up the bin ratios starting from the highest bin and stops adding up the bin ratios when the sum exceeds the high luminance ratio Wrate (in this example, when the bin ratios are added up from BIN31 to BIN27 so that the resultant sum (=1.4%) exceeds 1.0%).

The input luminance acquisition section 74 then calculates the input luminance 1*x* for the first reference point and the input luminance 2*x* for the second reference point (see FIG. 4) using the following formulas.

$$
\begin{aligned}
1x &= HYbin3 + (HYbin4 - HYbin3) \times (Brate - SRrate0\text{-}3) / Rbin4 \\
&= 31 + (39 - 31) \times (2.0 - (1.0 + 0.6)) / 0.7 \\
&= 35.57
\end{aligned}
$$

where HYbin3 is the highest luminance value for BIN3, HYbin4 is the highest luminance value for BIN4, SRrate0-3 is the sum of the bin ratios for BIN0 to BIN3, and Rbin4 is the bin ratio for BIN4.

$$
\begin{aligned}
2x &= HYbin27 + (HYbin27 - HYbin26) \times (Wrate - SRrate31\text{-}28) / Rbin27 \\
&= 223 + (223 - 215) \times (1.0 - (0.6 + 0.3)) / 0.5 \\
&= 221.4
\end{aligned}
$$

where HYbin27 is the highest luminance value for BIN27, HYbin26 is the highest luminance value for BIN26, SRrate31-28 is the sum of the bin ratios for BIN31 to BIN28, and Rbin27 is the bin ratio for BIN27.

The input luminance acquisition section 74 then calculates the input luminance 3*x* from the input luminances 1*x* and 2*x* (step S3, input luminance acquisition step). The input luminance acquisition section 74 calculates the input luminance 3*x*, for example, by calculating an average of the input luminances 1*x* and 2*x*. The input luminance acquisition section 74 may calculate the input luminance 3*x*, alternatively, as a ratio of weighted values of the input luminance 1*x* (lower side) and the input luminance 2*x* (higher side). For instance, when the 1*x*:2*x* weighting is equal to 1:2, the input luminance acquisition section 74 uses the following formula to calculate the input luminance 3*x*.

$$3x=(1\times 1x+2\times 2x)/1+2$$

When the approximate minimum luminance described above is used as an input luminance 4*x*, the input luminance acquisition section 74 may acquire the approximate maximum luminance from the histogram. Specifically, the input luminance acquisition section 74 may acquire any luminance value in the lowest bin that has a non-zero frequency (in this example, the highest luminance value "23" in BIN2 in Table 1) as the approximate minimum luminance.

In addition, when the approximate maximum luminance described above is used as an input luminance 5*x*, the input luminance acquisition section 74 may acquire the approximate maximum luminance from the histogram. Specifically, the input luminance acquisition section 74 may acquire any luminance value in the highest bin that has a non-zero frequency (in this example, the highest luminance value "239" in BIN29 in Table 1) as the approximate minimum luminance.

The limiter processing section 82 performs a limiter process on the input luminances 1*x* to 5*x* for the first to fifth reference points (step 4). The limiter processing section 82 specifies predetermined, externally fed limit values Lim1 to Lim6 on the X-axis as shown in FIG. 4.

The limit value Lim1 gives a lower limit value for the minimum luminance Ymin. The limit value Lim2 gives an upper limit value for the minimum luminance Ymin and a lower limit value for the input luminance 1*x*. The limit value Lim3 gives an upper limit value for the input luminance 1*x* and a lower limit value for the input luminance 3*x*. The limit value Lim6 gives an upper limit value for the maximum luminance Ymax. The limit value Lim5 gives a lower limit value for the maximum luminance Ymax and an upper limit value for the input luminance 2*x*. The limit value Lim4 gives a lower limit value for the input luminance 2*x* and an upper limit value for the input luminance 3*x*.

The limiter processing section 82 changes the input luminances 1*x* 2*x*, 4*x*, and 5*x* in a suitable manner in accordance with the seven cases below. The input luminance 3*x*, once subjected to the limiter process by the limiter processing section 82, falls in the range from the limit value Lim3 to the limit value Lim4.

The limiter processing section 82 either changes the input luminance 4*x* (minimum luminance Ymin) and the input luminance 5$x$ (maximum luminance Ymax) outputted from the maximum and minimum luminance acquisition section 72 in a suitable manner or changes the input luminance 4$x$ (approximate minimum luminance) and the input luminance 5$x$ (approximate maximum luminance) outputted the input luminance acquisition section 74 in a suitable manner.

Case 1: The input luminances 1$x$ 2$x$, 4$x$, and 5$x$ fall between the limit values Lim3 and Lim4.

The limiter processing section 82 changes the input luminance 4$x$ to the limit value Lim2 and changes the input luminance 1$x$ to the limit value Lim3. The limiter processing section 82 also changes the input luminance 2$x$ to the limit value Lim4 and changes the input luminance 5$x$ to the limit value Lim5.

Case 2: The input luminance 4$x$ falls between the limit values Lim2 and Lim3, the input luminances 1$x$ and 2$x$ fall between the limit values Lim3 and Lim4, and the input luminance 5$x$ falls between the limit values Lim4 and Lim5.

The limiter processing section 82 changes the input luminances 1$x$ 2$x$, 4$x$, and 5$x$ in the same manner as in case 1.

Case 3: Both the input luminances 1$x$ and 4$x$ fall between the limit values Lim2 and Lim3, and both the input luminances 2$x$ and 5$x$ fall between the limit values Lim4 and Lim5.

The limiter processing section 82 changes the input luminance 4$x$ to the limit value Lim2, but does not change the input luminance 1$x$. In addition, the limiter processing section 82 does not change the input luminance 2$x$, but changes the input luminance 5$x$ to the limit value Lim5.

Case 4: The input luminance 4$x$ falls between the limit values Lim2 and Lim3, the input luminance 1$x$ falls between the limit values Lim3 and Lim4, the input luminance 2$x$ falls between the limit values Lim4 and Lim5, and the input luminance 5$x$ falls between the limit values Lim5 and Lim6.

The limiter processing section 82 does not change the input luminances 1$x$ 2$x$, 4$x$, and 5$x$.

Case 5: Both the input luminances 1$x$ and 4$x$ fall between the limit values Lim1 and Lim2, and both the input luminance 2$x$ and 5$x$ fall between the limit values Lim5 and Lim6.

The limiter processing section 82 does not change the input luminance 4$x$ to the limit value Lim2, but changes the input luminance 1$x$ to the limit value Lim2. In addition, the limiter processing section 82 changes the input luminance 2$x$ to the limit value Lim5, but does not change the input luminance 5$x$.

Case 6: The input luminance 4$x$ is smaller than the limit value Lim1, the input luminance 1$x$ falls between the limit values Lim2 and Lim3, the input luminance 2$x$ falls between the limit values Lim5 and Lim6, and the input luminance 5$x$ is greater than the limit value Lim6.

The limiter processing section 82 changes the input luminance 4$x$ to the limit value Lim1 and changes the input luminance 1$x$ to the limit value Lim2. In addition, the limiter processing section 82 changes the input luminance 2$x$ to the limit value Lim5 and changes the input luminance 5$x$ to the limit value Lim6.

Case 7: Both the input luminances 1$x$ and 4$x$ are smaller than the limit value Lim1, and both the input luminances 2$x$ and 5$x$ are greater than the limit value Lim6.

The limiter processing section 82 changes the input luminances 1$x$ 2$x$, 4$x$, and 5$x$ in the same manner as in case 6.

The interval between the input luminances 1$x$ and 4$x$ and the interval between the input luminances 2$x$ and 5$x$ can be too narrow in cases 3 to 7. Accordingly, when the interval between the input luminances 1$x$ and 4$x$ is smaller than a first prescribed value, the limiter processing section 82 changes either the input luminances 1$x$ or the input luminance 4$x$ or both in such a manner as to ensure that the interval between the input luminances 1$x$ and 4$x$ is equal to the first prescribed value. When the interval between the input luminances 2$x$ and 5$x$ is smaller than a second prescribed value, the limiter processing section 82 changes either the input luminance 2$x$ or the input luminance 5$x$ or both in such a manner as to ensure that the interval between the input luminance 2$x$ and 5$x$ is equal to the second prescribed value.

The limiter processing section 82 thus prevents the interval between the input luminances 1$x$ and 4$x$ from approaching zero and prevents the interval between the input luminances 2$x$ and 5$x$ from approaching zero. The first prescribed value and the second prescribed value may be either equal to each other or different from each other.

After the limiter process is performed on the input luminances 1$x$ to 3$x$ in step S4, the output luminance calculation section 83 calculates gains for use in the calculation of output luminances 1$y$ to 3$y$ associated respectively with the input luminances 1$x$ to 3$x$, prior to the computation of the output luminances 1$y$ to 3$y$ (step S5).

The output luminance calculation section 83 calculates a gain for use in the computation of the input luminance 1$x$ on the basis of the relationship shown in FIG. 5. FIG. 5 represents a gain G1 for an input luminance Y1.

A gain GL1 denotes a minimum gain when the input luminance Y1 is equal to a smaller prescribed value Y1$a$, and a gain GH1 denotes a maximum gain when the input luminance Y1 is greater than or equal to a prescribed value Y1$b$ which is in turn greater than the prescribed value Y1$a$. The gain G1 increases linearly between the prescribed values Y1$a$ and Y1$b$ and stays unchanged at the gain GH1 at and above the prescribed value Y1$b$.

The output luminance calculation section 83, upon being fed with the input luminances 1$x$ and 4$x$ outputted from the limiter processing section 82 as the input luminance Y1, calculates the gain G1 using the following formula.

$$G1=(1x-4x)\times(GH1-GL1)/Y1b-Y1a$$

The output luminance calculation section 83 calculates a gain for use in the computation of the input luminance 2$x$ on the basis of the relationship shown in FIG. 6. FIG. 6 represents a gain G2 for an input luminance Y2.

A gain GL2 denotes a minimum gain when the input luminance Y2 is equal to a smaller prescribed value Y2$a$, and a gain GH2 denotes a maximum gain when the input luminance Y2 is greater than or equal to a prescribed value Y2$b$ which is in turn greater than the prescribed value Y2$a$. The gain G2 increases linearly between the prescribed values Y2$a$ and Y2$b$ and stays unchanged at the gain GH2 at and above the prescribed value Y2$b$.

The output luminance calculation section 83, upon being fed with the input luminances 2$x$ and 5$x$ outputted from the limiter processing section 82 as the input luminance Y2, calculates the gain G2 using the following formula.

$$G2=(5x-2x)\times(GH2-GL2)/Y2b-Y2a$$

The output luminance calculation section 83 calculates a gain for use in the computation of the input luminance 3$x$ on the basis of the relationship shown in FIG. 7. FIG. 7 represents a gain G3 for an average luminance (%) outputted from the average luminance acquisition section 71. When the input image is a white image (white-only image), the average luminance is equal to 100%. Specifically, the output luminance calculation section 83, upon being fed with an average luminance, outputs the gain G3 corresponding to the average luminance in reference to a table that is in accordance with the relationship shown in FIG. 7.

A gain GL3 is minimum gain. A gain GH3 is a maximum gain. A gain GM3 may be any gain between the gains GL3 and GH3. The gain G3 is equal to the gain GL3 for a range above a prescribed range ΔYH (e.g., 10%) that is above a median YC. The gain G3 is equal to the gain GM3 for a range below a prescribed range ΔYL (e.g., 10%) that is below the median YC. The gain G3 increases linearly from the gain GM3 to GH3 in the prescribed range ΔYL and decreases linearly from the gain GH3 to GL3 in the prescribed range ΔYH.

Upon the gains G1 to G3 being calculated in step S5, the output luminance calculation section 83 computes the output luminances 1*y* to 3*y* by using the gains G1 to G3 (step S6, output luminance generation step).

The output luminance calculation section 83 computes the output luminance 1*y* using the gain G1 and the following formula.

$$1y=4x+G1\times(1x-4x)$$

The output luminance calculation section 83 computes the output luminance 2*y* using the gain G2 and the following formula.

$$2y=5x-G2\times(5x-2x)$$

The output luminance calculation section 83 computes the output luminance 3*y* using the gain G3 and the following formula.

$$3y=\{(2y-1y)/(2x-1x)\}\times(3x-1x)\times G3+1y$$

After the limiter process is performed on the input luminances 4*x* and 5*x* in step S4, the output luminance calculation section 83 computes output luminances 4*y* and 5*y* corresponding respectively to the input luminances 4*x* and 5*x* (step S7).

The output luminance calculation section 83 sets the output luminance 4*y* to a value lower than the input luminance 4*x* and sets the output luminance 5*y* to a value higher than the input luminance 5*x*. For instance, when the input luminance 4*x* is equal to 30, the output luminance calculation section 83 sets the output luminance 4*y* to 16. Meanwhile, when the input luminance 5*x* is equal to 200, the output luminance calculation section 83 sets the output luminance 5*y* to 235. These settings render the contrast of the output image greater than the contrast of the input image.

The input luminance acquisition section 74 may acquire the approximate minimum luminance described above instead of the minimum luminance Ymin. The input luminance acquisition section 74 may also acquire the approximate maximum luminance described above instead of the maximum luminance Ymax.

The input luminance acquisition section 74 changes the approximate minimum luminance to the input luminance 4*x* when the approximate minimum luminance is used and changes the approximate maximum luminance to the input luminance 5*x* when the approximate maximum luminance is used.

Thus, the output luminances 1*y* to 3*y* are calculated for the first to third reference points respectively in step S6, and the output luminances 4*y* and 5*y* are calculated for the fourth and fifth reference points respectively in step S7. The output luminance calculation section 83 outputs, to the gamma curve generation section 84, the input luminances 1*x* to 5*x* passed through the limiter processing section 82 and the computed output luminances 1*y* to 5*y*.

The gamma curve generation section 84 generates a gamma curve on the basis of the input luminances 1*x* to 5*x* and the output luminances 1*y* to 5*y* (step S8). In this generation of a gamma curve, the gamma curve generation section 84 first identifies the first to fifth reference points based on the input luminances 1*x* to 5*x* and the output luminances 1*y* to 5*y* as shown in FIG. 13. The gamma curve generation section 84 then connects the fourth reference point to a point where the gray levels for the input luminance and the output luminance are equal to 0, connects the fifth reference point to a point where the gray level for the input luminance is equal to 255 and the gray level for the output luminance is slightly lower than 255, and connects those first to fifth reference points that are adjacent to each other. The gamma curve generation section 84 may alternatively connect these points in any other sequence. A more detailed description is given below of how the gamma curve generation section 84 connects the points, with reference to FIGS. 14 to 16.

FIG. 14 shows two curved lines connecting the first reference point and the third reference point as an example of the curved line drawn by the gamma curve generation section 84 to connect reference points. Referring to FIG. 14, the gamma curve generation section 84 connects the first reference point and the third reference point in such a manner that the curved line connecting the first reference point and the third reference point runs within the area enclosed by a pair of vertically extending straight lines passing through the first and third reference points respectively and a pair of horizontally extending straight lines passing through the first and third reference points respectively. The other reference points are connected in a similar manner.

If the third reference point resides above the straight line connecting the first reference point and the second reference point in the X-Y coordinate system (that is, if the middle luminance is to be enhanced), the gamma curve generation section 84 may generate, for example, any one of curved lines 15A to 15D shown in FIG. 15.

The curved line 15A represents an output luminance that is enhanced across the entire range from the first reference point to the second reference point. The gamma curve generation section 84 can render the entire video appear brighter through the generation of the curved line 15A.

The curved line 15B represents an output luminance that is enhanced for the range from the first reference point to the third reference point in the low gray level region and is subdued for the range from the third reference point to the second reference point in the high gray level region. The gamma curve generation section 84 can render a dark video appear brighter through the generation of the curved line 15B.

The curved line 15C represents an output luminance that is subdued for the range from the first reference point to the third reference point in the low gray level region and is enhanced for the range from the third reference point to the second reference point in the high gray level region. The gamma curve generation section 84 can render a video appear with vivid black and enhanced high gray levels through the generation of the curved line 15C.

The curved line 15D represents an output luminance that is subdued for the range from the first reference point to a first intermediate point residing between the first reference point and the third reference point and for the range from the second reference point to a second intermediate point residing between the second reference point and the third reference point and is enhanced for the range from the third reference point to the first intermediate point and for the range from the third reference point to the second intermediate point. The gamma curve generation section 84 can render a video appear with enhanced average luminance through the generation of the curved line 15D.

If the third reference point resides below the straight line connecting the first reference point and the second reference point in the X-Y coordinate system (that is, if the middle luminance is to be subdued), the gamma curve generation section 84 may generate, for example, any one of curved lines 16A to 16D shown in FIG. 16.

The curved line 16A represents an output luminance that is enhanced for the range from the first reference point to a third intermediate point residing between the first reference point and the third reference point and for the range from the second reference point to a fourth intermediate point residing between the second reference point and the third reference point and is subdued for the range from the third reference point to the third intermediate point and for the range from the third reference point to the fourth intermediate point. The gamma curve generation section 84 can render a video appear with subdued average luminance through the generation of the curved line 16A.

The curved line 16B represents an output luminance that is enhanced for the range from the first reference point to the third reference point in the low gray level region and is subdued for the range from the third reference point to the second reference point in the high gray level region. The gamma curve generation section 84 can render a video appear with enhanced luminance in an intermediate gray level region, hence appear with reduced contrast, through the generation of the curved line 16B.

The curved line 16C represents an output luminance that is subdued for the range from the first reference point to the third reference point in the low gray level region and is enhanced for the range from the third reference point to the second reference point in the high gray level region. The gamma curve generation section 84 can render a video appear with vivid black through the generation of the curved line 16C.

The curved line 16D represents an output luminance that is subdued across the entire range from the first reference point to the second reference point. The gamma curve generation section 84 can render the entire video appear darker through the generation of the curved line 16D.

The luminance conversion section 85, in the contrast adjusting section 2, converts an inputted luminance signal in accordance with the luminance characteristics represented by the thus generated gamma curve as detailed above (luminance conversion step). The output luminance 3*y* is enhanced or subdued in the middle luminance range of the calculated gamma curve in comparison with the gamma curve that has a linear middle luminance range between the low luminance range and the high luminance range thereof.

This particular configuration hence enhances or subdues the middle luminance region of the output image, thereby enabling an image with many pixels in the middle luminance region to be displayed brighter across the screen.

The output luminance calculation section 83 computes the output luminance 3*y* in accordance with the average luminance of the input image. This particular configuration enables the output luminance for the third reference point to be determined so as to reduce the variations of the peak luminance of the output image when the display device 101 is an OLED (organic light-emitting diode) display device built around OLEDs (organic light-emitting diodes). This is so because the OLED (organic light-emitting diode) tends to exhibit a lower peak luminance with a higher average luminance and exhibit a higher peak luminance with a lower average luminance.

The output luminance calculation section 83 computes the output luminance 1*y* in accordance with a difference between the input luminance 1*x* and either the minimum luminance Ymin or the approximate minimum luminance of the input image. This particular configuration can prevent a phenomenon where the output luminance does not change near the low luminance end (black level tone is almost flat).

The output luminance calculation section 83 computes the output luminance 2*y* in accordance with a difference between the input luminance 2*x* and either the maximum luminance Ymax or the approximate maximum luminance of the input image. This particular configuration can prevent a phenomenon where the output luminance does not change near the high luminance end (white level tone is almost flat).

The present invention is capable of preventing almost flat black level tone and almost flat white level tone by the mechanism detailed in the following.

Patent Literature 1 (see paragraph 0033 and FIG. 7) describes that the gains (gain_upper, gain_lower) of a gamma curve increase with an increase in the sum frequency and that the luminance-increasing gain (gain_upper) and the luminance-increasing gain (gam_lower) can be set to different values. When the gain_lower is greater than the gain_upper in the black range, the synthesized gam [X] is a sagging curve (see FIG. 2 of Patent Literature 1), and the output luminance can be clipped at low gray levels depending on the gain settings, so that shadows may be crushed (gray levels may be lost). It is also deduced from the description that the output luminance can be clipped at high gray levels depending on the gain settings, so that highlights may be blown off (gray levels are lost).

In contrast, in the display device 101, the interval between the input luminances 1*x* and 4*x* increases in an input image with many pixels in the black range. This particular configuration increases the gain G1, that is, the slope of the straight line connecting the first reference point and the fourth reference point. The configuration hence renders the slope of the straight line approach a linear gamma curve, thereby preventing almost flat black level tone.

Likewise, in the display device 101, the interval between the input luminances 2*x* and 5*x* increases in an input image with many pixels in the white range. This particular configuration increases the gain G2, that is, the slope of the straight line connecting the second reference point and the fifth reference point. The configuration hence renders the slope of the straight line approach a linear gamma curve, thereby preventing almost flat white level tone.

Embodiment 2

The following will describe Embodiment 2 of the present invention with reference to FIGS. 8 to 12. Members of Embodiment 2 that have the same function as members of Embodiment 1 are indicated by the same reference numerals, and description thereof is omitted.

Figure 8:
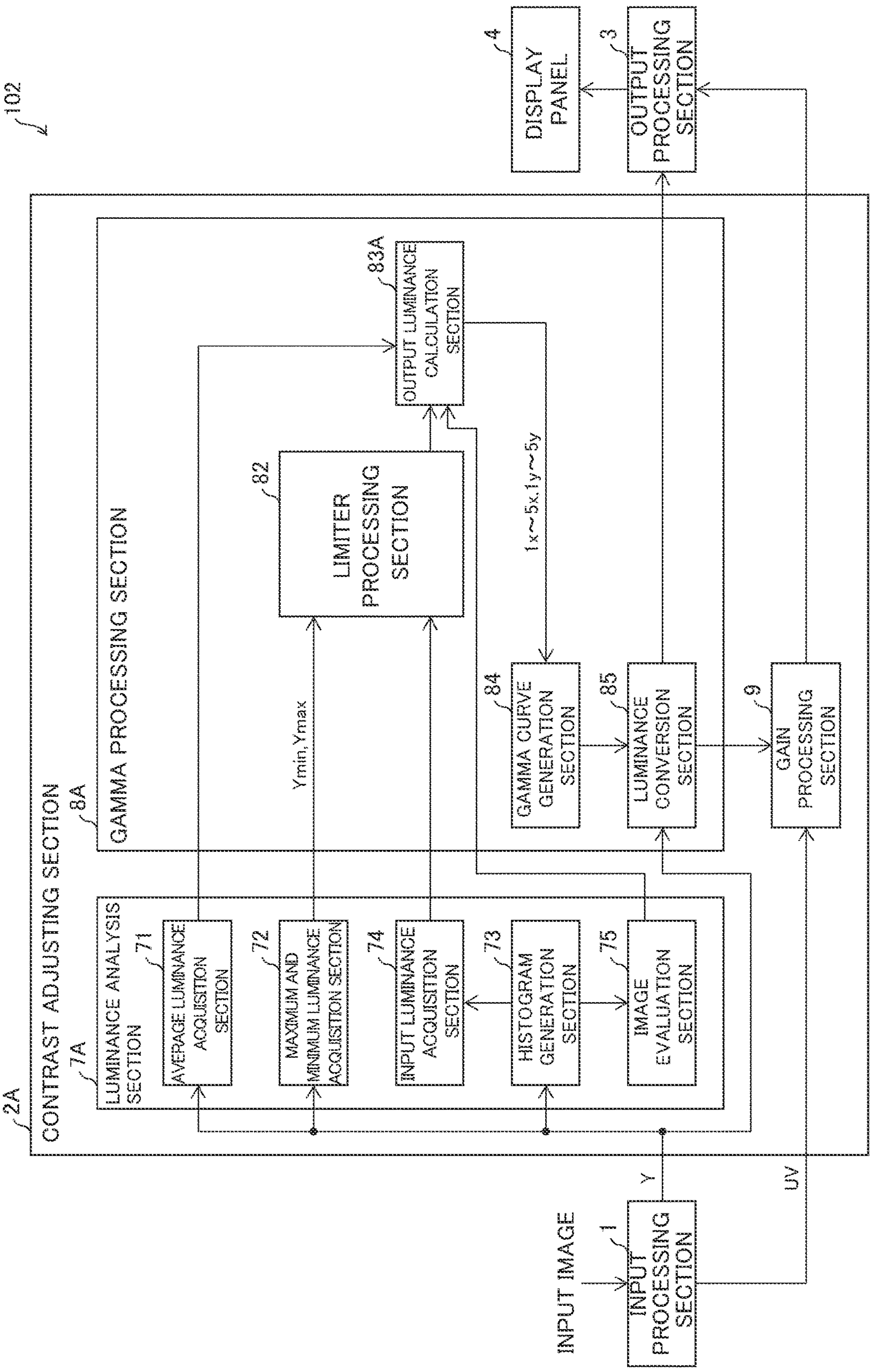
FIG. 8 is a block diagram of a configuration of a display device in accordance with Embodiment 2 of the present invention.

FIG. 8 is a block diagram of a configuration of a display device 102 in accordance with Embodiment 2.

Referring to FIG. 8, the display device 102 includes an input processing section 1, an output processing section 3, and a display panel 4, similarly to the display device 101 in accordance with Embodiment 1. The display device 102 further includes a contrast adjusting section 2A in place of the contrast adjusting section 2 in the display device 101. The contrast adjusting section 2A includes a luminance analysis section 7A and a gamma processing section 8A.

The luminance analysis section 7A includes an average luminance acquisition section 71, a maximum and minimum luminance acquisition section 72, a histogram generation section 73, and an input luminance acquisition section 74, similarly to the luminance analysis section 7 in the contrast adjusting section 2. The luminance analysis section 7A includes an image evaluation section 75.

The image evaluation section 75 determines, from, for example, an input luminance histogram generated by the histogram generation section 73, whether or not the input luminance distribution of an input image is concentrated in a particular range. If the proportion of the sum of not more than a prescribed number of highest frequencies to the sum of the frequencies in all the bins in the histogram is greater than or equal to a prescribed proportion, the image evaluation section 75 determines that the input luminance distribution of an input image is concentrated in a particular range.

The gamma processing section 8A in the display device 102 includes a limiter processing section 82, a gamma curve generation section 84, and a luminance conversion section 85, similarly to the gamma processing section 8 in the contrast adjusting section 2. The gamma processing section 8A further includes an output luminance calculation section 83A in place of the output luminance calculation section 83 in the gamma processing section 8.

The output luminance calculation section 83A computes an output luminance in a similar manner to the output luminance calculation section 83 in the gamma processing section 8. The output luminance calculation section 83A computes, for an input image determined by the image evaluation section 75 to have an input luminance distribution that is concentrated in a particular range, an output luminance in such a manner that the input luminance and the associated output luminance of the input image have a fixed ratio.

A description is now given of the contrast adjustment performed by the contrast adjusting section 2A structured as described in the foregoing in the display device 102. An input image having an input luminance distribution concentrated in a particular range will be referred to as an input image that has a special pattern throughout the following description.

Figure 9:
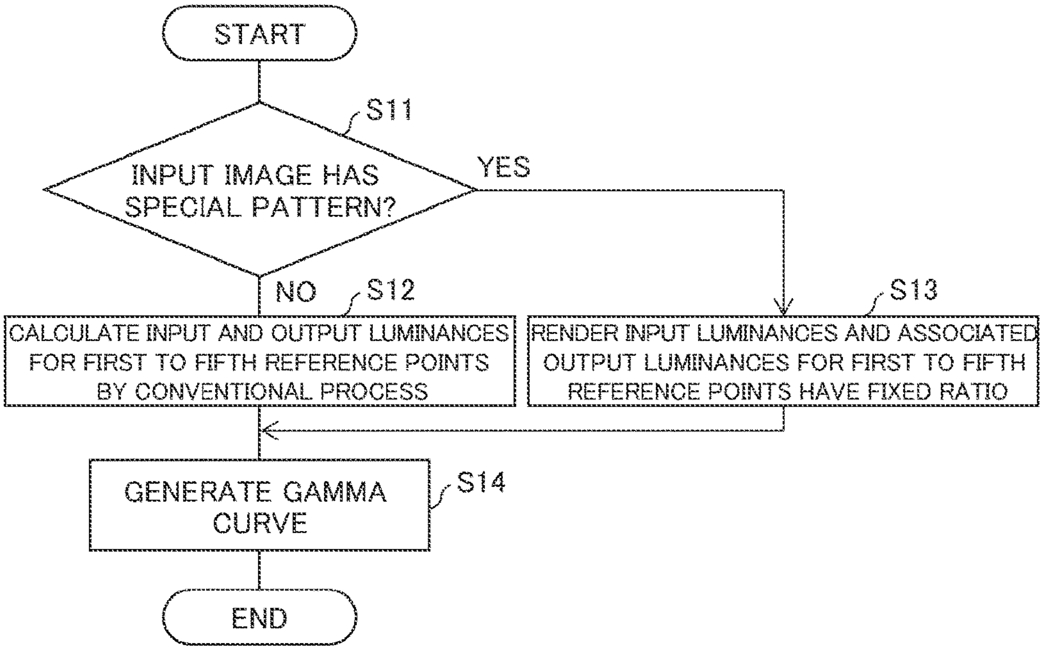
FIG. 9 is a flow chart representing a process of generating a gamma curve in a contrast adjusting section in the display device shown in FIG. 8.
Figure 10:
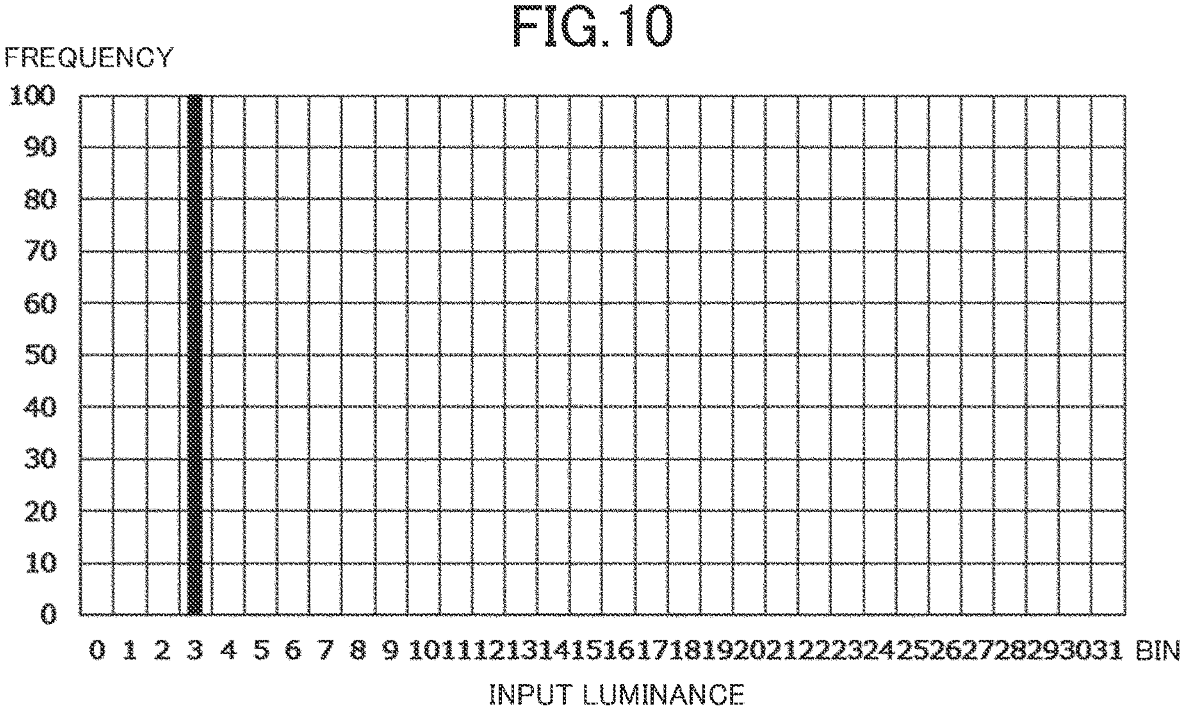
FIG. 10 is an exemplary histogram of input luminance for an input image that has a special pattern.
Figure 11:
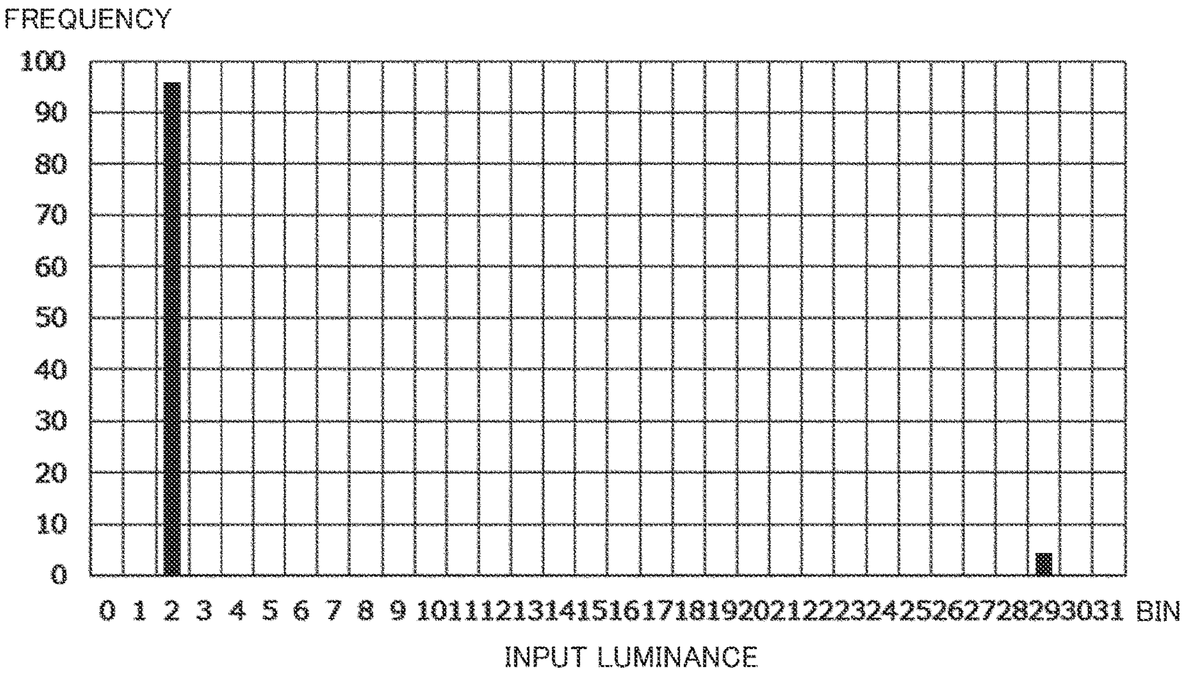
FIG. 11 is an exemplary histogram of input luminance for another input image that has a special pattern.
Figure 12:
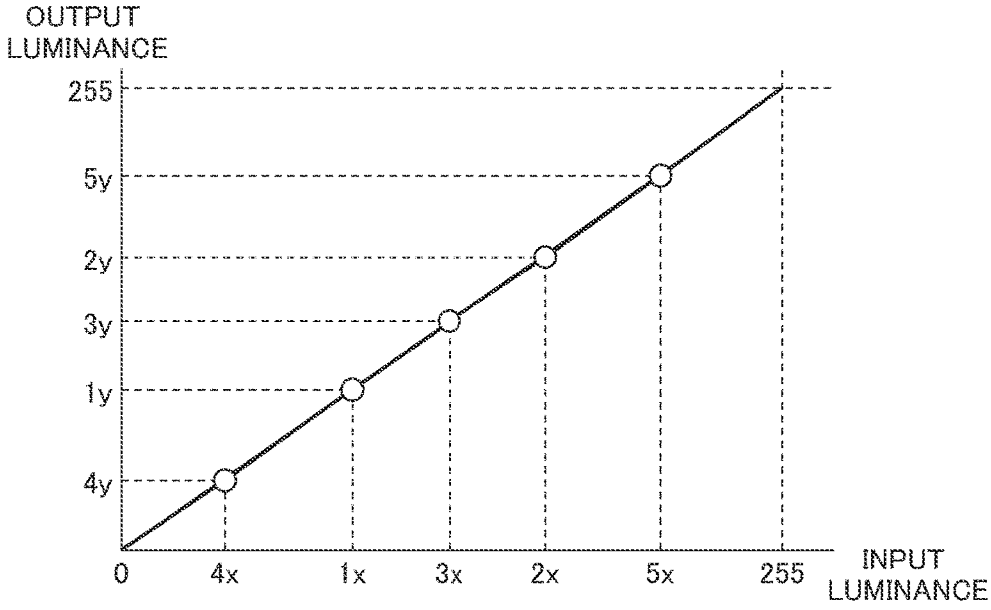
FIG. 12 is a diagram of an exemplary gamma curve generated for an input image that has a special pattern.

FIG. 9 is a flow chart representing a process of generating a gamma curve in the contrast adjusting section 2A. FIG. 10 is an exemplary histogram of input luminance for an input image that has a special pattern. FIG. 11 is an exemplary histogram of input luminance for another input image that has a special pattern. FIG. 12 is a diagram of an exemplary gamma curve generated by the contrast adjusting section 2A for an input image that has a special pattern.

Referring to FIG. 9, the image evaluation section 75 first determines, from the histogram of input luminance generated by the histogram generation section 73, whether or not the input image has a special pattern (step S11). If the proportion of the sum of not more than a prescribed number of highest frequencies to the sum of the frequencies in all the bins in the histogram is greater than or equal to a prescribed proportion (e.g., 99.5%), the image evaluation section 75 determines that the input image has a special pattern. The prescribed number may be, for example, three and may have any other value.

The input image that has a maximum frequency in a histogram is, for example, an image filled entirely with a single color. For instance, for an input image filled entirely with blue, the histogram shows a 100% frequency in BIN3 as shown in FIG. 10.

The input image that has a second maximum frequency in a histogram is, for example, a window pattern filled with two colors or a block check pattern filled with two colors. For instance, for an input window pattern image having a central, white rectangular region on a black background, the histogram shows a 96% frequency in BIN2 and a 4% frequency in BIN29 as shown in FIG. 11.

The input image that has a third maximum frequency in a histogram is, for example, a window pattern filled with three colors.

If the image evaluation section 75 determines in step S11 that the input image does not have a special pattern (NO), the input luminance acquisition section 74 and the output luminance calculation section 83A calculate an input luminance and an output luminance respectively for the first to fifth reference points (step S12). In step S12, the input luminance acquisition section 74 and the output luminance calculation section 83A perform computation that is similar to the routine computation of the input and output luminances performed respectively by the input luminance acquisition section 74 and the output luminance calculation section 83 in the display device 101.

If the image evaluation section 75 determines in step S11 that the input image has a special pattern (YES), the output luminance calculation section 83A computes an output luminance for the first to fifth reference points in such a manner that the input luminance and the associated output luminance have a fixed ratio (step S13).

Upon the input and output luminances being obtained for the first to fifth reference points in either step S12 or step S13, the gamma curve generation section 84 generates a gamma curve that passes through these input and output luminances (step S14). The generated gamma curve is linear as shown in FIG. 12.

As detailed in the foregoing, in the display device 102, a linear gamma curve is generated for an input image that has a special pattern, and a gamma curve is generated that reflects changes made for linearity in the middle luminance region for an input image that has an input luminance distribution spread over a wide luminance range. This particular configuration adjusts the gamma curve so as to have linearity for an input image that has a special pattern and that does not need to be improved in contrast. The configuration can hence prevent contrast from being improved for such an input image. The configuration can therefore improve contrast by adjusting the gamma curve only for an input image that needs to be improved in contrast.

The image evaluation section 75 determines from the histogram that the input image has a special pattern. This particular configuration enables an input image that has a special pattern and that has an input luminance distribution concentrated in a particular range to be detected on the basis of high-frequency bins in the histogram.

The image evaluation section 75 has been described in Embodiment 2, as an example, as being able to determine from the histogram that the input image has a special pattern. This is by no means the only possible implementation of the invention. Alternatively, for example, if the input image data contains embedded therein a flag indicating that the image has a special pattern, the image evaluation section 75 may determine based on the flag that the input image has a special pattern.

Software Implementation

The control blocks of the display device 101, 102 (particularly, the contrast adjusting section 2, 2A) may be implemented by logic circuits (hardware) fabricated, for example, in the form of an integrated circuit (IC chip) and may be implemented by software.

In the former form of implementation, the contrast adjusting section 2, 2A may include a dedicated ASIC (application specific IC) composed of such logic circuits as to perform prescribed computation and may alternatively include a PLD (programmable logic device), such as a FPGA (field-programmable gate array), that can incorporate memory elements.

In the latter form of implementation, the display device 101, 102 includes a computer that executes instructions from display control programs or software by which various functions are provided. This computer includes among others at least one processor (control device) and at least one storage medium containing the display control programs in a computer-readable format. The processor in the computer then retrieves and runs the programs contained in the storage medium, thereby achieving the object of the present invention.

The processor may be, for example, a CPU (central processing unit). The storage medium may be a "non-transitory, tangible medium" such as a ROM (read-only memory), a tape, a disc/disk, a card, a semiconductor memory, or programmable logic circuitry. The display device 101, 102 may further include, for example, a RAM (random access memory) for loading the programs. The processor may be a DSP (digital signal processor) or a like processor capable of performing digital signal processing at high speed.

The programs may be supplied to the computer via any transmission medium (e.g., over a communications network or by broadcasting waves) that can transmit the programs.

The present invention, in an aspect thereof, encompasses data signals on a carrier wave that are generated during electronic transmission of the programs.

General Description

The present invention, in aspect 1 thereof, is directed to a display device including: an input luminance acquisition section configured to acquire an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point; an output luminance generation section configured to generate an output luminance for the input luminance for the first reference point, an output luminance for the input luminance for the second reference point, and an output luminance for the input luminance for the third reference point in such a manner that a straight line connecting the first reference point and the third reference point has a different slope than does a straight line connecting the third reference point and the second reference point; and a luminance conversion section configured to convert the input luminances in the input image to the output luminances based on the gamma curve specified using the input and output luminances for the first, second, and third reference points, to output the output image.

This configuration enables a third reference point to be specified between the first reference point (residing in a low luminance region) and the second reference point (residing in a high luminance region) in a middle luminance region. Furthermore, the straight line connecting the first reference point and the third reference point has a different slope than does the straight line connecting the third reference point and the second reference point. The configuration can hence enhance and subdue the output luminance for the third reference point relative to the straight line connecting the first reference point and the second reference point. The configuration therefore enables control of characteristics in the middle luminance region.

In aspect 2 of the present invention, the display device of aspect 1 may be configured so as to further include a gamma curve generation section configured to generate the gamma curve based on the input and output luminances for the first, second, and third reference points.

This configuration enables a gamma curve to be generated that includes a desirably shaped curved line between the first reference point and the third reference point and a desirably shaped curved line between the second reference point and the third reference point.

In aspect 3 of the present invention, the display device of aspect 1 or 2 may be configured such that the output luminance generation section generates the output luminance for the third reference point in accordance with an average luminance of the input image.

This configuration enables the output luminance for the third reference point to be determined in accordance with an average luminance of the input image so as to suit the characteristics of the display section that displays the output image. For instance, the OLED tends to exhibit a lower peak luminance with a higher average luminance and exhibit a higher peak luminance with a lower average luminance. The configuration therefore enables the output luminance for the third reference point to be determined so as to reduce the variations of the peak luminance of the output image when the display device is an OLED display device built around OLEDs.

In aspect 4 of the present invention, the display device of any one of aspects 1 to 3 may be configured such that the output luminance generation section generates the output luminance for the first reference point in accordance with a difference between the input luminance for the first reference point and either a minimum luminance of the input image or an approximate minimum luminance that is approximately equal to the minimum luminance.

This configuration enables the output luminance for the first reference point to be determined in accordance with a difference between the input luminance for the first reference point and either a minimum luminance or an approximate minimum luminance. The configuration can hence prevent a phenomenon where the output luminance does not change near the low luminance end.

In aspect 5 of the present invention, the display device of any one of aspects 1 to 4 may be configured such that the output luminance generation section generates the output luminance for the second reference point in accordance with a difference between the input luminance for the second reference point and either a maximum luminance of the input image or an approximate maximum luminance that is approximately equal to the maximum luminance.

This configuration enables the output luminance for the second reference point to be determined in accordance with a difference between the input luminance for the second reference point and the input luminance for the fifth reference point. The configuration can hence prevent a phenomenon where the output luminance does not change near the high luminance end.

In aspect 6 of the present invention, the display device of any one of aspects 1 to 5 may be configured so as to further include an image evaluation section configured to determine whether or not the input luminances in the input image are distributed in a particular range, wherein upon the image evaluation section determining that the input luminances in the input image are distributed in a particular range, the output luminance generation section generates the output luminances in such a manner that the input luminances in the input image and the output luminances for the input luminances have a fixed ratio.

This configuration adjusts the gamma curve so as to have linearity for an input image that has a special pattern and that does not need to be improved in contrast. The configuration can hence prevent contrast from being improved for such an input image. The configuration can therefore improve contrast by adjusting the gamma curve only for an input image that needs to be improved in contrast.

In aspect 7 of the present invention, the display device of aspect 6 may be configured such that if a proportion of a sum of not more than a prescribed number of highest frequencies to a sum of frequencies in all bins in a histogram of the input luminances is greater than or equal to a prescribed proportion, the image evaluation section determines that the input luminances in the input image are distributed in a particular range.

This configuration enables an input image that has a special pattern and that has an input luminance distribution concentrated in a particular range to be detected on the basis of high-frequency bins in the histogram.

The present invention, in aspect 8 thereof, is directed to a display control method including: the input luminance acquisition step of acquiring an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point; the output luminance generation step of generating an output luminance for the input luminance for the first reference point, an output luminance for the input luminance for the second reference point, and an output luminance for the input luminance for the third reference point in such a manner that a straight line connecting the first reference point and the third reference point has a different slope than does a straight line connecting the third reference point and the second reference point; and the luminance conversion step of converting the input luminances in the input image to the output luminances based on the gamma curve specified using the input and output luminances for the first, second, and third reference points, to output the output image.

The display device of any aspect of the present invention may be implemented on a computer, in which case the computer is controlled so as to serve as the various sections (software elements) of the display device. The invention hence encompasses a display control program causing the computer to implement the display device thereon.

General Description

The present invention is not limited to the description of the embodiments above and may be altered within the scope of the claims. Embodiments based on a proper combination of technical means disclosed in different embodiments are encompassed in the technical scope of the present invention. Furthermore, new technological features can be created by combining different technical means disclosed in the embodiments.

REFERENCE SIGNS LIST

74 Input Luminance Acquisition Section
75 Image Evaluation Section
83 Output Luminance Calculation Section (Output Luminance Generation Section)
84 Gamma Curve Generation Section
85 Luminance Conversion Section
101, 102 Display Device
1*x* to 5*x* Input Luminance
1*y* to 5*y* Output Luminance

What is claimed is:

1. A display device comprising:

at least one non-transitory storage medium containing display control programs;

at least one processor configured to execute the display control programs to:

acquire an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point;

calculate an output luminance for the first reference point based on the input luminance for the first reference point, calculate an output luminance for the second reference point based on the input luminance for the second reference point, and calculate an output luminance for the third reference point based on the input and output luminances for the first reference point, the input and output luminances for the second reference point, and a gain according to the input image, in such a manner that a straight line connecting the first reference point and the third reference point has a different slope than does a straight line connecting the third reference point and the second reference point;

generate the gamma curve based on the input luminances for the first, second, and third reference points which were acquired and the output luminances for the first, second, and third reference points which were calculated; and convert the input luminances in the input image to the output luminances based on the gamma curve specified using the input and output luminances for the first, second, and third reference points, to output the output image.

2. The display device according to claim 1, wherein the processor calculates the output luminance for the third reference point in accordance with an average luminance of the input image.

3. A display device comprising:

at least one non-transitory storage medium containing display control programs;

at least one processor configured to execute the display control programs to:

acquire an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point;

generate an output luminance for the input luminance for the first reference point, an output luminance for the input luminance for the second reference point, and an output luminance for the input luminance for the third reference point in such a manner that a straight line connecting the first reference point and the third reference point has a different slope than does a straight line connecting the third reference point and the second reference point;

convert the input luminances in the input image to the output luminances based on the gamma curve specified using the input and output luminances for the first, second, and third reference points, to output the output image; and generate the gamma curve based on the input and output luminances for the first, second, and third reference points, wherein the processor generates the output luminance for the first reference point in accordance with a difference between the input luminance for the first reference point and either a minimum luminance of the input image or an approximate minimum luminance that is approximately equal to the minimum luminance.

4. A display device comprising:

at least one non-transitory storage medium containing display control programs;

at least one processor configured to execute the display control programs to:

acquire an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point;

generate an output luminance for the input luminance for the first reference point, an output luminance for the input luminance for the second reference point, and an output luminance for the input luminance for the third reference point in such a manner that a straight line connecting the first reference point and the third reference point has a different slope than does a straight line connecting the third reference point and the second reference point;

convert the input luminances in the input image to the output luminances based on the gamma curve specified using the input and output luminances for the first, second, and third reference points, to output the output image; and generate the gamma curve based on the input and output luminances for the first, second, and third reference points, wherein the processor generates the output luminance for the second reference point in accordance with a difference between the input luminance for the second reference point and either a maximum luminance of the input image or an approximate maximum luminance that is approximately equal to the maximum luminance.

5. A display device comprising:

at least one non-transitory storage medium containing display control programs;

at least one processor configured to execute the display control programs to:

acquire an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point;

generate an output luminance for the input luminance for the first reference point, an output luminance for the input luminance for the second reference point, and an output luminance for the input luminance for the third reference point in such a manner that a straight line connecting the first reference point and the third reference point has a different slope than does a straight line connecting the third reference point and the second reference point;

convert the input luminances in the input image to the output luminances based on the gamma curve specified using the input and output luminances for the first, second, and third reference points, to output the output image;

generate the gamma curve based on the input and output luminances for the first, second, and third reference points; and determine whether or not the input luminances in the input image are distributed in a particular range, wherein upon the processor determining that the input luminances in the input image are distributed in a particular range, the processor generates the output luminances in such a manner that the input luminances in the input image and the output luminances for the input luminances have a fixed ratio.

6. The display device according to claim 5, wherein if a proportion of a sum of not more than a prescribed number of highest frequencies to a sum of frequencies in all bins in a histogram of the input luminances is greater than or equal to a prescribed proportion, the processor determines that the input luminances in the input image are distributed in a particular range.

7. A non-transitory computer-readable storage medium having stored therein the display control program causing a computer to function as the display device according to claim 1.

8. A display control method comprising:

an input luminance acquisition step of acquiring an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point;

an output luminance calculation step of calculating an output luminance for the first reference point based on the input luminance for the first reference point, an output luminance for the second reference point based on the input luminance for the second reference point, and an output luminance for the third reference point based on the input and output luminances for the first reference point, the input and output luminances for the second reference point, and a gain according to the input image, in such a manner that a straight line connecting the first reference point and the third reference point has a different slope than does a straight line connecting the third reference point and the second reference point;

a gamma curve generation step of generating the gamma curve based on the input luminances for the first, second, and third reference points which were acquired by the input luminance acquisition step and the output luminances for the first, second, and third reference points which were calculated by the output luminance calculation step; and a luminance conversion step of converting the input luminances in the input image to the output luminances based on the gamma curve specified using the input and output luminances for the first, second, and third reference points, to output the output image.

9. A display device comprising:

an input luminance acquisition circuit configured to acquire an input luminance for a first reference point, an input luminance for a second reference point, and an input luminance for a third reference point, the first, second, and third reference points being used in specifying a gamma curve representing output luminances that are luminances in an output image for input luminances that are luminances in an input image, the first reference point residing in a low luminance region of the input luminances, the second reference point residing in a high luminance region of the input luminances, and the third reference point residing between the first reference point and the second reference point;

an output luminance calculation circuit configured to calculate an output luminance for the first reference point based on the input luminance for the first reference point, calculate an output luminance for the second reference point based on the input luminance for the second reference point, and calculate an output luminance for the third reference point based on the input and output luminances for the first reference point, the input and output luminances for the second reference point, and a gain according to the input image, in such a manner that a straight line connecting the first reference point and the third reference point has a different slope than does a straight line connecting the third reference point and the second reference point;

a gamma curve generation circuit configured to generate the gamma curve based on the input luminances for the first, second, and third reference points which were acquired by the input luminance acquisition circuit and the output luminances for the first, second, and third reference points which were calculated by the output luminance calculation circuit; and a luminance conversion circuit configured to convert the input luminances in the input image to the output luminances based on the gamma curve specified using the input and output luminances for the first, second, and third reference points, to output the output image.

* * * * *